(12) United States Patent
Whitney

(10) Patent No.: US 6,217,091 B1
(45) Date of Patent: Apr. 17, 2001

(54) LIFTING GRIPS

(76) Inventor: Denzil E. Whitney, 643 Rio Vista, Napa, CA (US) 94558

( * ) Notice: Subject to any disclaimer, the term of this patent is extended or adjusted under 35 U.S.C. 154(b) by 0 days.

(21) Appl. No.: 09/536,250

(22) Filed: Mar. 27, 2000

Related U.S. Application Data (63) Continuation of application No. 08/594,149, filed on Jan. 31, 1996, now Pat. No. 6,082,794.

(51) Int. Cl.$^7$ .................................................. B65G 7/12
(52) U.S. Cl. .............................. 294/15; 294/25; 294/27.1
(58) Field of Search .................................. 294/5, 8.6, 15, 294/16, 25, 26, 27.1, 61; 15/186, 200; 119/632; 224/191, 232, 234, 660, 676, 904

(56) References Cited

U.S. PATENT DOCUMENTS

| | | | |
|---|---|---|---|
| D. 26,777 | 3/1897 | Donnelly | 294/5 X |
| 568,237 | 9/1896 | Carley | 294/5 |
| 1,061,014 | 5/1913 | Sawyer | 294/25 |
| 1,203,339 | 10/1916 | Holstein | 294/16 |
| 1,333,792 | 3/1920 | Bunnell | 294/25 |
| 1,583,606 | 5/1926 | Roussel | 294/25 |
| 2,116,928 | 5/1938 | Hanneman | 294/27.1 |
| 2,607,988 | 8/1952 | Williams | 294/61 X |
| 2,777,724 | 1/1957 | Carter | 294/25 |
| 2,903,171 | 9/1959 | Rutledge | 224/232 |
| 3,010,500 | 11/1961 | Jordan | 294/25 X |
| 3,464,731 | 9/1969 | Eramo | 294/8.6 |
| 3,473,712 | 10/1969 | Genchi | 224/234 |
| 4,109,952 | 8/1978 | Monzain | 294/16 |
| 4,225,174 | 9/1980 | Hennessy | 294/113 |
| 4,226,349 | 10/1980 | Uccellini | 294/25 X |
| 4,253,593 | 3/1981 | Pattermann | 224/904 X |
| 4,678,217 | 7/1987 | Viola | 294/16 |
| 4,682,803 | 7/1987 | Andrews | 294/16 X |

*Primary Examiner*—Johnny D. Cherry
(74) *Attorney, Agent, or Firm*—Coudert Brothers (57) ABSTRACT

The present invention defines an improved pair of grips for lifting bulk materials, boxes and cartons. The grips have an ergonomically designed handhold on one side and a replaceable array of needle-like pointed projections on the other side for engaging the lifted piece. The projections are tapered, narrow and angled such that when engaged with a load, additional gripping power results. Holsters are provided for safekeeping when not in use. The holsters allow the user to grab the grips, engage the box or carton and replace the grips into the holsters with a few natural and fluid movements.

10 Claims, 7 Drawing Sheets

LIFTING GRIPS

This application is a continuation application of U.S. application Ser. No. 08/594,149 filed Jan. 31, 1996, now U.S. Pat. No. 6,082,794.

FIELD OF THE INVENTION

The instant invention defines a material handling grip for lifting cartons, packages, boxes and containers or geometric objects of various shapes, sizes and materials. The invention therefore deals with the general technologies of hand tools, and material handling.

BACKGROUND OF THE INVENTION

Anyone who has ever handled parcels, packages, or cartons of a variety of materials, for example cardboard or some other paper or fibrous shipping material, knows how awkward lifting and carrying such cartons can be. Because cartons or boxes are typically smooth on the outside, during normal handling, i.e., by hand, one is at risk of dropping the carton, particularly if the carton is of a large or unwieldy size. In addition, the amount of bending or body English normally required in handling cartons of such as just described subjects one to the danger of back, neck, or shoulder injury.

Other difficulties encountered by materialmen in handling cartons on a dock or moving boxes from trucks to conveyor belts and the like, is the wear and tear on the hands of the worker. In particular, cardboard boxes, which as previously mentioned are smooth, by their nature sap the human hand of its oils and moisture by their absorbent characteristics. Common problems encountered by box handlers are the drying and cracking of their hands, as well as the formation of callouses by the inherent slipping of the carton or box during handling.

Some workers wear gloves to counteract such hand problems. However, when wearing gloves, the dexterity and ability to manipulate a box or carton as well as the overall grip obtained is less than that achieved by the hand.

What is needed then, is an aid for material handlers to help manipulate and handle boxes minimizing the duty on the hands, as well as improving the grip needed to handle such materials safety.

Another example which illustrates common problems among materialmen is the movement of boxes or cubes of material from conveyor belts. Standard cubic materials, such as cork, styrofoam, or boxes and cartons require the use of two hands. When using bare hands without any lifting aid, the worker is limited in the weight which can be moved due to the ability to grip and lift the material. Because of the awkwardness of handling these materials as well as the limitations of the hand to firmly grip the material, what is needed is an aid for workers which allows a firm grip and provides an ability to lift heavier materials than can be lifted simply by hand.

Often, the size or girth of an object or carton is such that while liftable in terms of weight, it takes two persons to manage the piece, because one person has to reach opposing corners of the box in order to get a firm grip. If a device existed which could allow the manipulation of such pieces such as oversized cartons, then the labor requirement for some handling tasks would be cut in half.

Prior art, for the most part, has concerned itself with scissor-like lifting devices which span a carton in order to pick it up. In U.S. Pat. No. 4,109,952 to Monzain, issued Aug. 29, 1978, a scissor operated tong device was for use in lifting packages. The claws of the device span the carton; thereby requiring a device at least the size of the piece to be lifted. The ends of the claws provide a stable gripping function at the corner of the package. The Monzain device may be operated with only one hand, but the position of the device is such that the carried load typically hangs vertically. Such a vertical positioning of the load is essentially driven by the design of the device, especially when the package to be lifted is of significant weight. No practical provision is made to manipulate the package; only basic lifting and setting of a load is capable with such a device.

Another example of such a scissor-like device is the kind of carrier tool employed to lift car batteries and other heavy objects which are dangerous to touch by hand. Again, the user is limited to simply picking up and putting down whatever load is being carried. Such a device is U.S. Pat. No. 4,678,217, issued to Viola et al. Jul. 7, 1987. In this case, the device simply clamps two parallel sides of a battery or other load. Limited manipulation is possible with a device having such a handle configuration and contacting a box or carton in such a way. In Viola, and other similar devices, the weight of the carton provides the force to close the clamps. Only firm boxes may be lifted when the load is heavy. What is needed is a better way of picking up and manipulating packages, cartons, bulk material and boxes, providing a capability to manipulate and maneuver a load without damage, even when the load is heavy.

Prior art showing a more manipulative way of picking up objects exists as U.S. Pat. No. 4,225,174, issued Sep. 30, 1980 to Hennessy et al. This device uses a trigger actuated set of jaws to collect refuse. Such a device is not designed, however, for picking up large or heavy items. The long distance between the operator's hand and the piece to be picked up or manipulated is too long, allowing too great a moment of force acting on the hand and wrist, making manipulation of heavy or large objects impractical.

Prior art showing a way to help workers manipulate boxes and cartons by using individually held grips is disclosed in U.S. Pat. No. 4,226,349 to Uccellini, issued Oct. 7, 1980. This patent was the first step in helping workers manipulate large or heavier boxes. The Uccellini patent utilizes two hand held blocks with a ledge that the user's fingers wrap around for lifting, and a series of pointed projections which engage a carton thereby providing the grip necessary to lift said carton. The Uccellini hand grips have limitations however, which have prevented it from achieving any market significance. These limitations include a matrix of printed projections fashioned in such a way that when disengaged from the box, leave the surface of the box excessively damaged. Also, the ledge of the outer portion of the block is limited in terms of the contact area between the fingers and the ledge, resulting in tiring the hand and restricting the lifting capability of the hand grips. Configured as they are, to use the Uccellini grips requires one to slide a hand through a fixed strap and around the finger ledge. If too loose, the grip may pitch or yaw, resulting in injury to the user or damage to the lifted piece.

What is needed is a hand grip which leaves no damage to the material or carton it is used to lift, and a grip which is comfortable to the hand, allowing longer use, control, and greater lifting capability.

The Uccellini grips also do no provide much in the way of manipulation of the lifted piece. The user may move the box, but is limited in the amount of rotation or tilt he or she may apply to the lifted piece. The gripping movement, needed to engage the carton is also awkward, requiring an extra penetrating movement due to the size of the projections disclosed in the patent.

What is needed then a grip device which will allow the user to manipulate cartons and boxes without the limitations of just generally lifting and setting the object. The grip device must also be easily engageable, allowing the user to use the grips in a natural motion.

Further, the device must allow the handling of larger and heavier loads, and provide a reliable and steady grip on the piece, with care not to damage the object, or in the case of a carton or box, the container or the goods inside. Such a device would provide a significant improvement over the current art for warehouse persons, delivery persons and stock workers.

SUMMARY OF THE INVENTION

The invention defines an improved pair of hand grips which can be used successfully to handle and manipulate bulk materials, cartons and boxes.

The invention employs a pair of grips which on one side have an ergonomically designed handhold. On the other side of the grip is located an array of removable pointed projections. These projections are finer than the type of projections disclosed in the Uccellini patent, and set at a different angle, allowing the lifting of heavy loads with a natural and easy motion. The grip itself is configured to slide in and out of a set of holsters worn by the user to allow safe keeping of the grips when not in use.

It is an object of the invention to pick cartons and boxes without leaving significant damage to the carton, box or other lifted piece. This is accomplished by the array of fine, almost needle-like points located on the contact side of the grip. The points are positioned at a predetermined angle relative to the vertical face of the block of approximately 45° to 80°, protruding about 1/16" to 1/2". The points are needle-like, tapered, and provide a tight friction fit as they enter the surface of the carton, leaving only smooth holes, in contrast to the prior art which leaves large, ragged tears. Such an array can successfully lift cartons weight upwards of 150 pounds, on a repeated basis in the same location on the carton, without noticeable damage.

It is a further object of the invention to provide a safer and more controllable lifting capability. This is accomplished by the utilization of an ergonomic grip which will fit all but the smallest of hands. With areas for the thumb and fingers to engage the grip spreading the contact area to the entire inside of the hand, more can be lifted, and the piece can be manipulated far easier than in the prior art. The hand will not become fatigued in the way a lift employing mainly finger contact would. Such a design allows longer and safer use, minimizing cramping of the fingers.

It is yet another object of the invention to provide a pair of holsters with said grips for safe storage during non-use. Such a carrying arrangement allows the grippers to be worn, ready for use, with the sharp points out of harm's way. Additionally, the hands may engage the grippers when at rest in the holsters, and they may be used and then reinserted into the holsters, ready for the next use. The holsters are flared at the top for easy entry and retrieval of the grips. The depth of the slot is such that the points do not touch the holster when at rest. The top of the holsters will extend above the cradle so that the points will not contact clothing when the grips are removed from or returned to the holster. The grips may be grabbed, removed, used and then returned to the holsters in fluid, easy, natural movements. Such a feature allows the safe use of the grippers, minimizing the potential danger of injury from an unprotected grip.

DETAILED DESCRIPTION OF THE INVENTION

Figure 5:
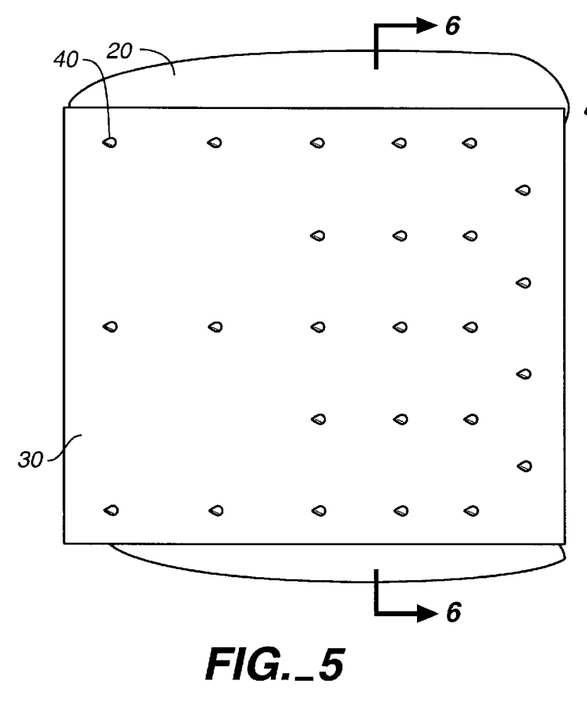
FIG. 5 is a bottom plan of a grip, showing the array of pointed projections.
Figure 6:
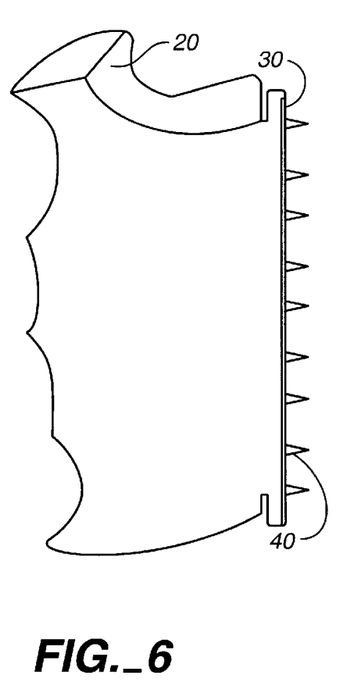
FIG. 6 is a side elevation cross section of the grip in FIG. 5 at line 6A showing the ergonomic contour of the handhold.
Figure 10:
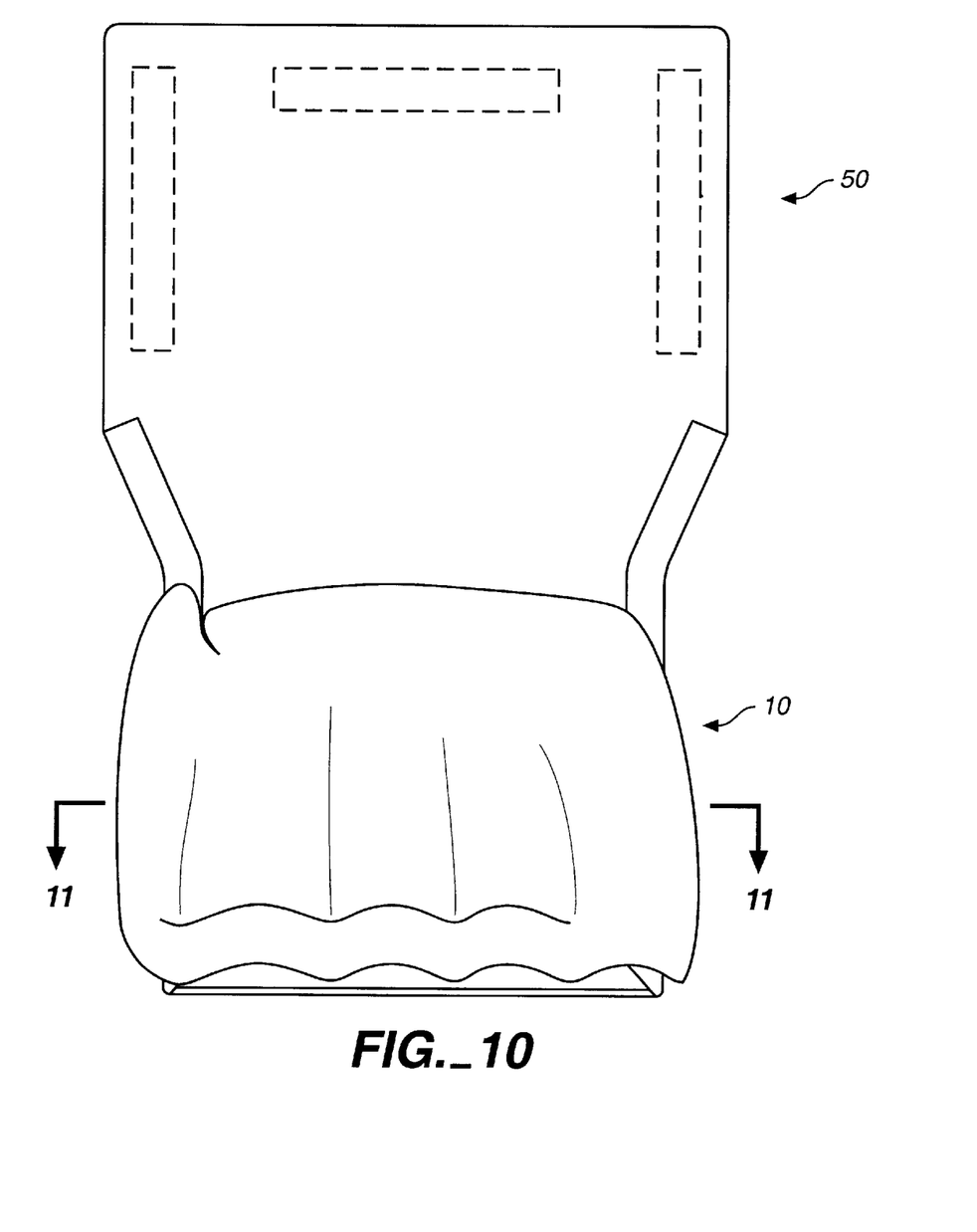
FIG. 10 is a top plan view of a grip retained in a holster.
Figure 11:
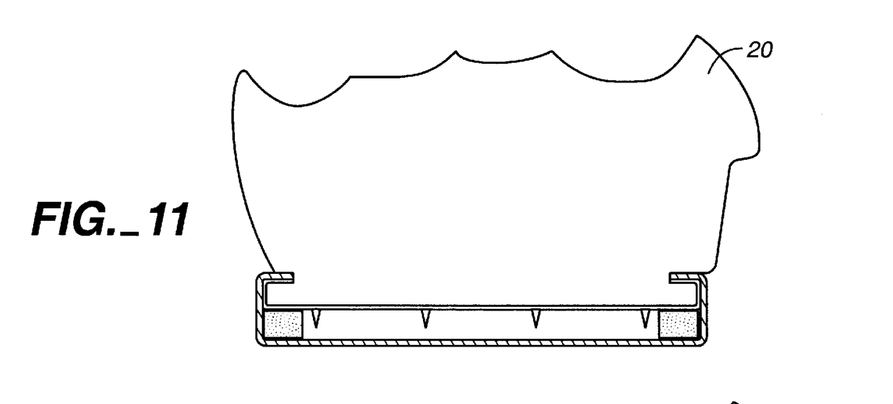
FIG. 11 is a front elevational section of FIG. 10 taken at line 11, showing the grip in the holster's channel.

The present invention 10 is primarily comprised of a handhold 20 of ergonomic shape as shown in FIGS. 6, 10 and 11, with an array 30 of pointed projections 40 fastened to the flat bottom of handhold 20 as shown in FIG. 5. The handhold is shaped to accommodate the fingers and thumb of a partially closed hand. The handhold can be fashioned of cast aluminum, molded plastic, or any other material which will support the weight of the lifted load, and will accept a fastening means which will affix the array 30 to the handhold as in FIG. 6.

Figure 12:
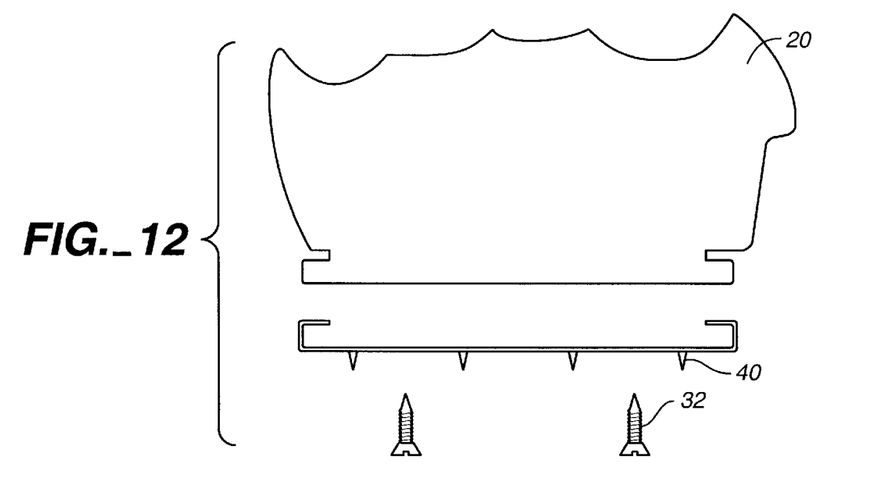
FIG. 12 is an exploded elevational view of the grip of FIG. 1, showing one embodiment of a removable array of pointed projections.
Figure 15:
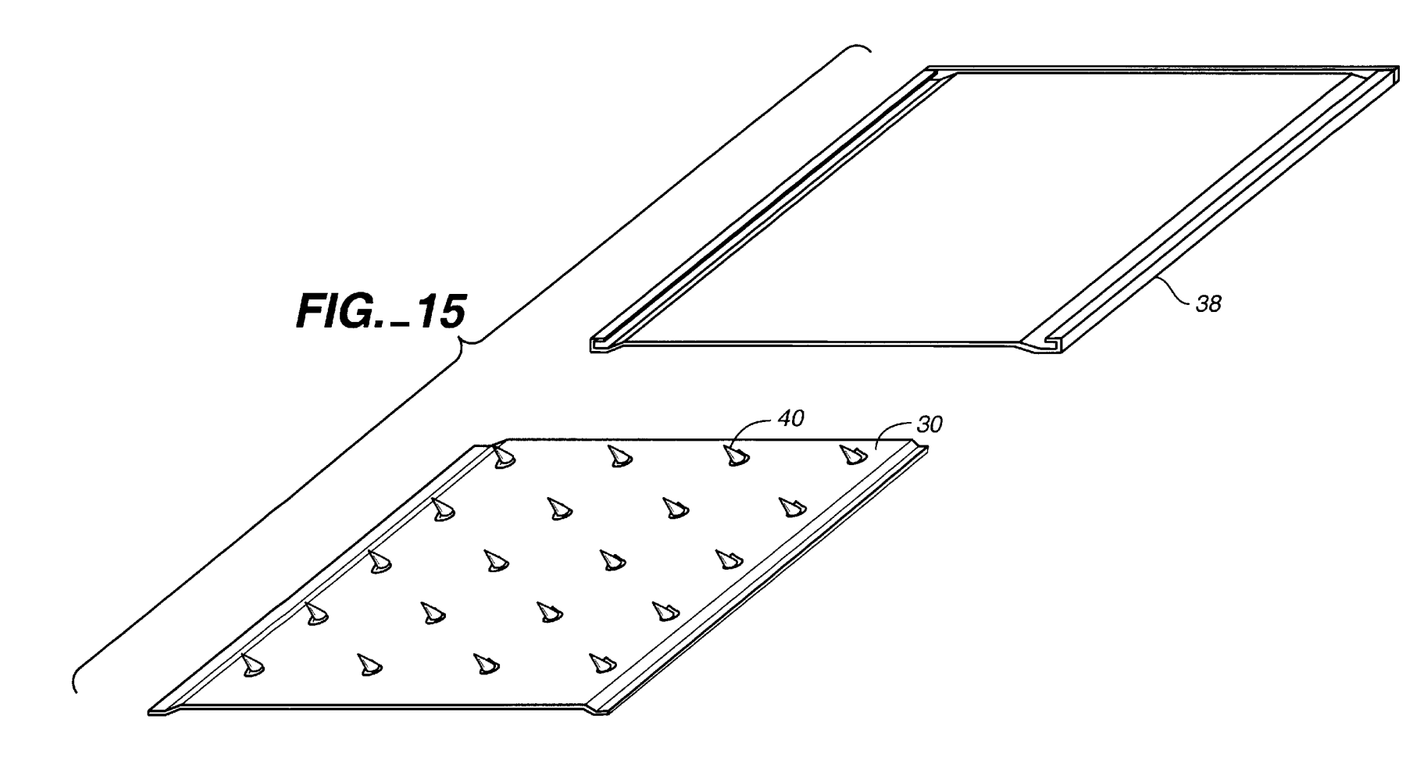
FIG. 15 depicts another embodiment of a removable array of pointed projections.

A fastening means for attaching array 30 to handhold 20 in one embodiment further comprises a plurality of screws 32 as fully disclosed in FIG. 12. FIG. 15 discloses an additional embodiment of the replaceable array 30, where array 30 slides into array holder 38 which is, in turn, affixed to handhold 20 as depicted in FIG. 4.

Figure 1:
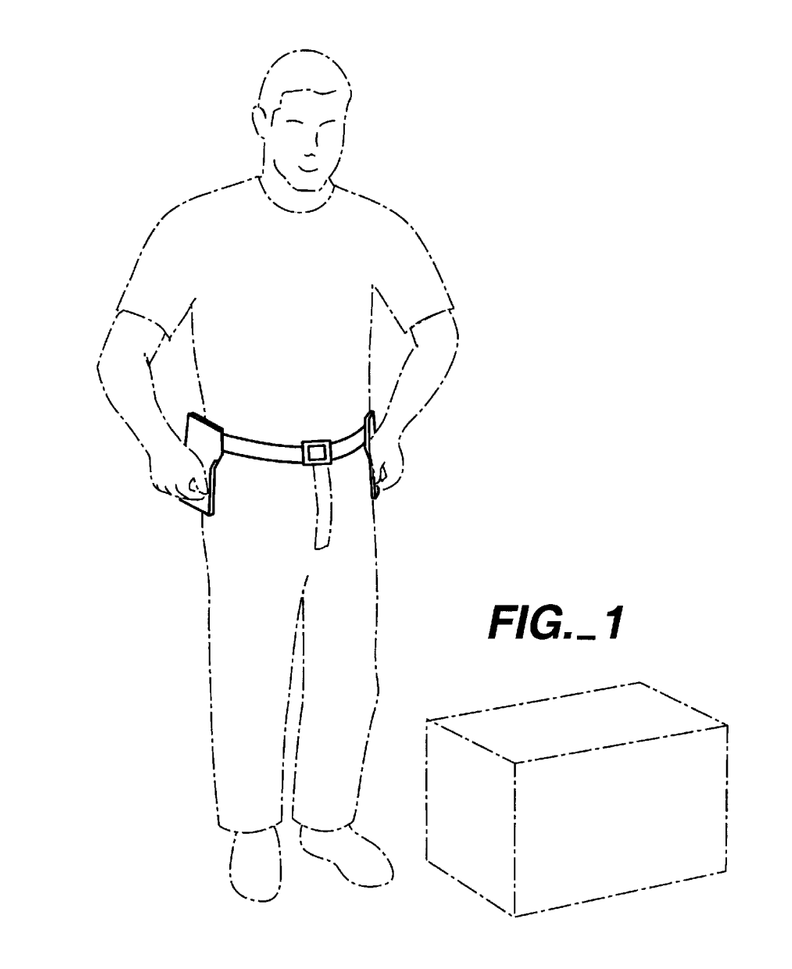
FIG. 1 is a perspective view of a user with hands positioned on the grip handholds while the grippers are in their holsters.
Figure 2:
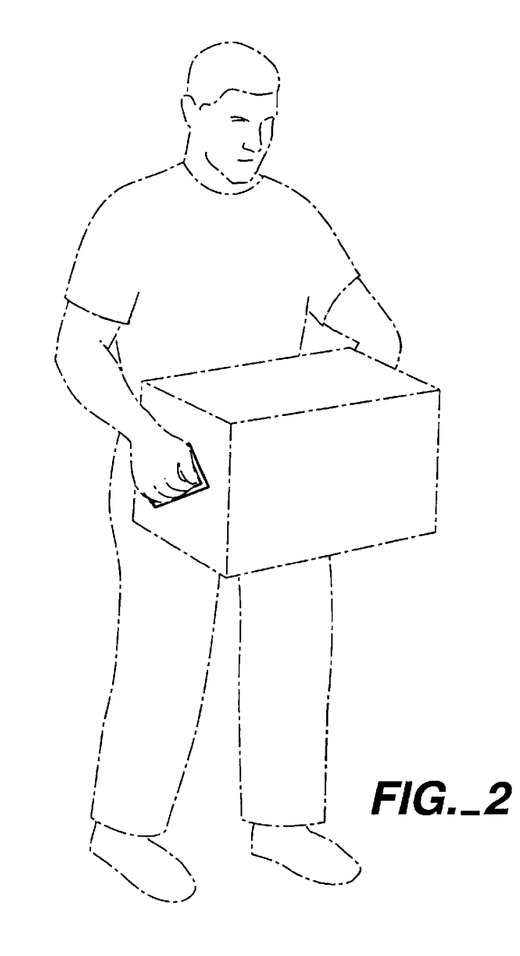
FIG. 2 is a depiction of the user using the grippers to hold a lifted carton.
Figure 3A:
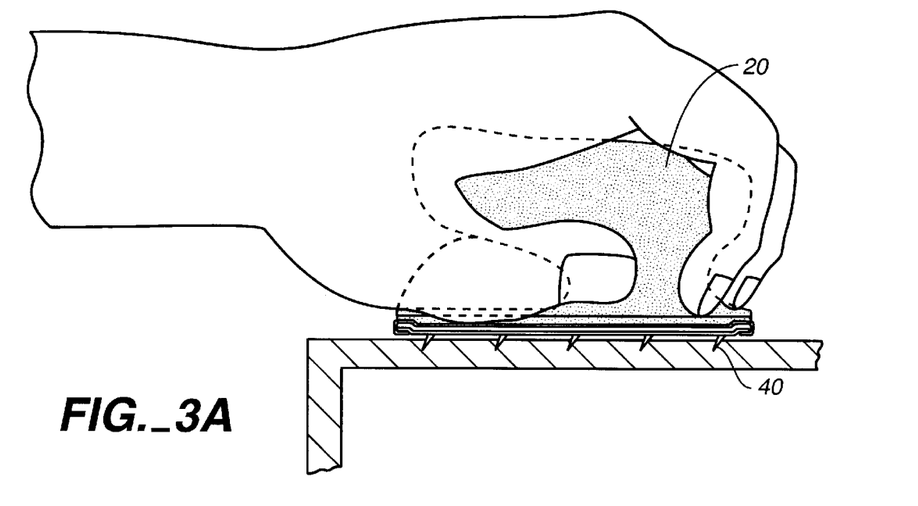
FIG. 3A is a side view of a gripper held against a carton.
Figure 3B:
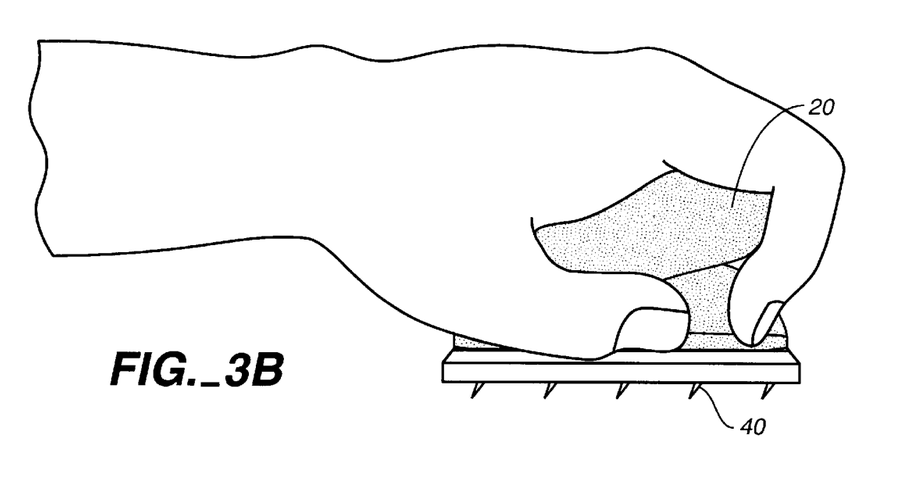
FIG. 3B is a side view of a grip held in a hand.
Figure 4:
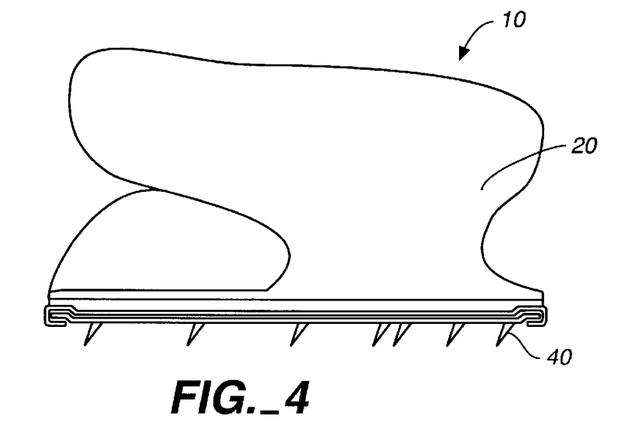
FIG. 4 is a side view of a grip.
Figures 13, 14:
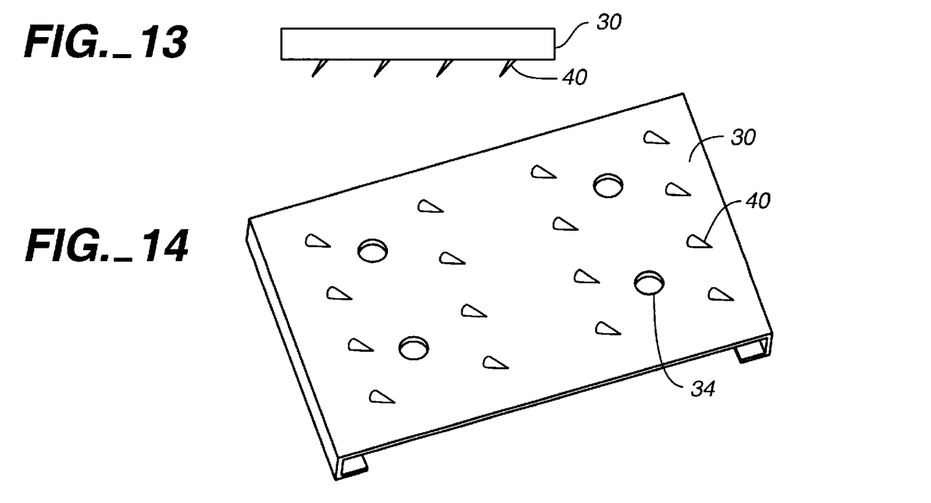
FIG. 13 is a side view of an array of pointed projections depicting a typical angle for the pointed projections.
FIG. 14 is a perspective view of a removable array of pointed projections.

FIGS. 4, 13 and 14 show the typical amount of angle between pointed projections 40 and the bottom of handhold 20. The array 30 is typically made of a metallic material such as aluminum or steel with projections 40 either fabricated as a part of the array 30 or as replaceable inserts to be slideably engaged with holder 38.

Figure 7:
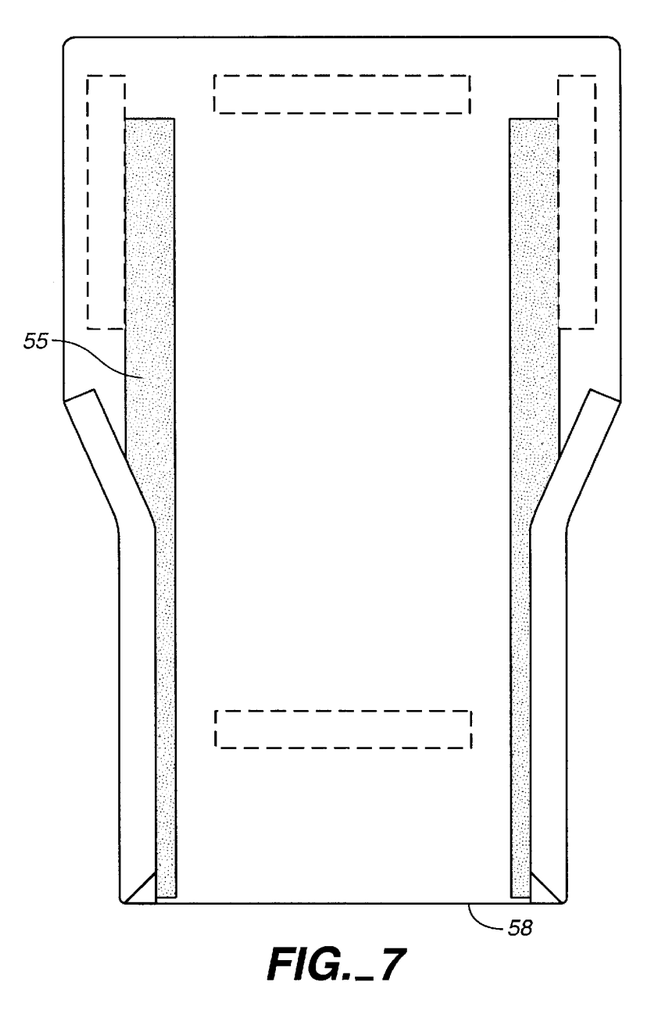
FIG. 7 is a plan view of the holster.
Figure 8:
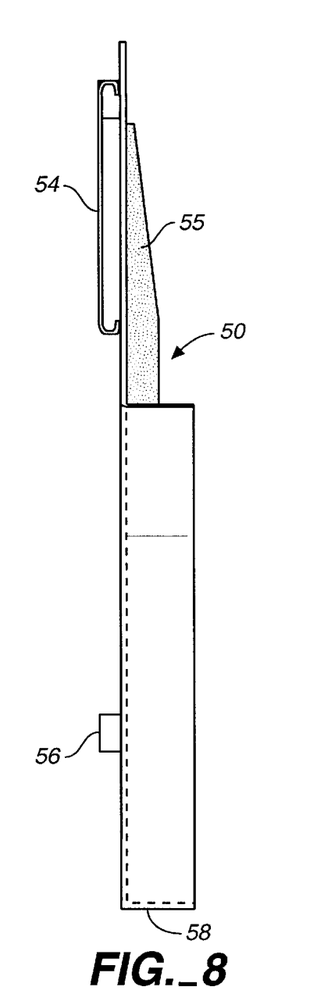
FIG. 8 is a side view of the holster in FIG. 7, showing the belt loop in the upper portion.
Figure 9:
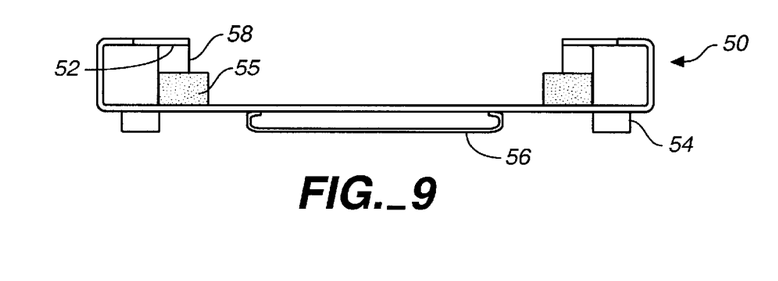
FIG. 9 is an elevation view of the holster of FIG. 7 showing the channels which are used to slide and retain the grips.

The holsters 50 are of a hard plastic or metal construction. Belt loops 54 and 56, as shown in FIGS. 7, 8 and 9 are integral to the holster. The holster 50 is fabricated with a channel 52 to accept the grips. The channel 52 is wide at the top than the bottom, as shown in FIG. 7, allowing easy insertion of the grip 10. A stop 58 is also fabricated as part of holster 50 to retain said grip. FIG. 10 shows grip 10 at the bottom of channel 52 in holster 50.

FIG. 11 shows the gap between the pointed projections 40 and holster 50 when the grip is retained in holster 50. A pair of spacers 55 in FIG. 7 serve to keep pointed projections 40 from contacting the surface of holster 50. FIG. 12 shows one alternative where the array 30 is shaped to fit handhold 20 in such a way as to also conform to the channel 52 in holster 50. In this embodiment, the entire array is replaceable as depicted in FIG. 14. In another embodiment, the projections 40 themselves are interchangeable as depicted in FIG. 15. Holder 38 may be affixed to handhold 20 by a variety of means including adhesive, configured by molding into said handhold 20, welding or brazing where metallic materials are used, etc.

While the invention has been described in connection with what is presently considered the most practical and preferred embodiment(s), it is to be understood that the invention is not limited to the disclosed embodiment(s) but, on the contrary to intended to cover various modifications and equivalent arrangements included within the scope of the appended claims.

What is claimed is:

1. A lifting grip comprising:

a handhold having a first side shaped to accommodate the fingers and thumb of a partially closed hand, and a second side having a generally flat surface, wherein the second side is opposite to and spaced from said first side;

an array of needle-like, tapered point projections angled with respect to said generally flat surface; and a fastening device for affixing said array to said handhold.

2. The lifting grip according to claim 1 wherein the fastening device is a holder attached to the handhold, and wherein said array of needle-like, tapered pointed projections is replaceably retained in said holder.

3. The lifting grip according to claim 2 wherein said array is slideably engageable in the holder.

4. The lifting grip according to claim 2 further comprising:

a locking mechanism for releasably retaining said array in said holder.

5. The lifting grip according to claim 1 wherein said fastening device comprises screws.

6. The lifting grip according to claim 1 wherein pointed projections extending approximately 1/16 inch to 1/2 inch from said handhold and are at an angle of approximately 45 to 80 degrees with respect to the generally flat surface.

7. The lifting grip according to claim 1 wherein the handhold is ergonomically designed.

8. The lifting grip according to claim 1 wherein the lifting grip is capable of lifting cartons of at least 150 pounds.

9. The lifting grip according to claim 1 wherein the handhold is made of molded plastic.

10. The lifting grip according to claim 1 wherein the pointed projections extending approximately 1/16 to 1/2 inch from said handhold.

* * * * *